(12) United States Patent
Anton

(10) Patent No.: US 7,270,895 B2
(45) Date of Patent: Sep. 18, 2007

(54) COATED ARTICLE WITH DARK COLOR

(75) Inventor: Bryce R. Anton, Longmont, CO (US)

(73) Assignee: Vapor Technologies, Inc., Boulder, CO (US)

( * ) Notice: Subject to any disclaimer, the term of this patent is extended or adjusted under 35 U.S.C. 154(b) by 0 days.

(21) Appl. No.: 11/099,756

(22) Filed: Apr. 5, 2005

(65) Prior Publication Data

US 2006/0222892 A1 Oct. 5, 2006

(51) Int. Cl.
*C04B 35/48* (2006.01)

(52) U.S. Cl. ...................................... 428/701

(58) Field of Classification Search ................ 428/701, 428/698; 501/87
See application file for complete search history.

(56) References Cited

U.S. PATENT DOCUMENTS

| | | | |
|---|---|---|---|
| 4,758,280 A | 7/1988 | Bergmann et al. | |
| 4,997,538 A | 3/1991 | Luthier et al. | |
| 5,176,964 A | 1/1993 | Marousek et al. | |
| 5,704,995 A | 1/1998 | Bradley | |
| 5,718,745 A | 2/1998 | Itoh et al. | |
| 5,928,977 A * | 7/1999 | Magnin et al. | 501/87 |
| 6,132,889 A * | 10/2000 | Welty et al. | 428/623 |
| 6,245,435 B1 | 6/2001 | O'Brien et al. | |

\* cited by examiner

*Primary Examiner*—Jennifer McNeil
*Assistant Examiner*—Daniel Miller
(74) *Attorney, Agent, or Firm*—Emch, Schaffer, Schaub & Porcello Co., L.P.A.

(57) ABSTRACT

An article is coated with a coating having a dark gray or bronze color. In a preferred embodiment, the coating comprises a nickel or polymer basecoat layer, and a color and protective stack layer comprised of layers of oxygen-rich refractory metal oxycarbides. The preferred dark grey, oxygen rich color layer is zirconium oxycarbide. A refractory metal adhesion layer and a refractory metal oxide top coat layer also may be used.

18 Claims, 2 Drawing Sheets

COATED ARTICLE WITH DARK COLOR

FIELD OF THE INVENTION

This invention relates to articles, particularly articles such as faucets, having a decorative and protective coating having the appearance of a dark color. More specifically the color is dark gray or a dark "oil rubbed" bronze color.

BACKGROUND OF THE INVENTION

Current industry practice with various brass articles such as faucets, faucet escutcheons, door knobs, door handles, door escutcheons and the like, is to first buff and polish the surface of the article to a high gloss and to then apply a protective organic coating, such as one comprised of acrylics, urethanes, epoxies and the like, onto this polished surface. This system has the drawback that the buffing and polishing operation, particularly if the article is of a complex shape, is labor intensive. Also, the known organic coatings are not always as durable as desired, and are susceptible to attack by acids. It would, therefore, be quite advantageous if brass articles, or indeed other articles, either plastic, ceramic, or metallic, could be provided with coating which provided the article with a decorative appearance as well as providing wear resistance, abrasion resistance and corrosion resistance.

SUMMARY OF THE INVENTION

The present invention is directed to an article coated with a layer coating having a dark color. Preferably, the color is dark gray or a dark bronze color. The coating comprises a color and protective layer comprised of a refractory metal oxycarbide wherein the oxygen content is greater than the carbon content. In the preferred embodiment, the refractory metal is zirconium.

The present invention also is directed to an article such as a plastic, ceramic, cermet or metallic article having the decorative and protective coating deposited on at least a portion of its surface. More particularly, it is directed to an article or substrate, particularly a metallic article such as stainless steel, aluminum, brass or zinc, having deposited on its surface the layers described herein. The coating is decorative and also provides corrosion resistance, wear resistance and abrasion resistance. The coating provides the appearance or color of dark gray or dark bronze.

Another embodiment includes a refractory metal adhesion layer between the color layer and the substrate.

Still another embodiment includes a refractory metal oxide top layer over the color layer.

DETAILED DESCRIPTION OF THE PREFERRED EMBODIMENT(S)

Article 10 is comprised of substrate 12. Substrate 12 can be comprised of any material onto which a plated layer can be applied, such as plastic, e.g., ABS, polyolefin, polyvinyl-chloride, and phenolformaldehyde, ceramic, cermet, metal or metal alloy. In one embodiment it is comprised of a metal or metallic alloy such as copper, steel, brass, zinc, aluminum, nickel alloys and the like.

Figure 1:
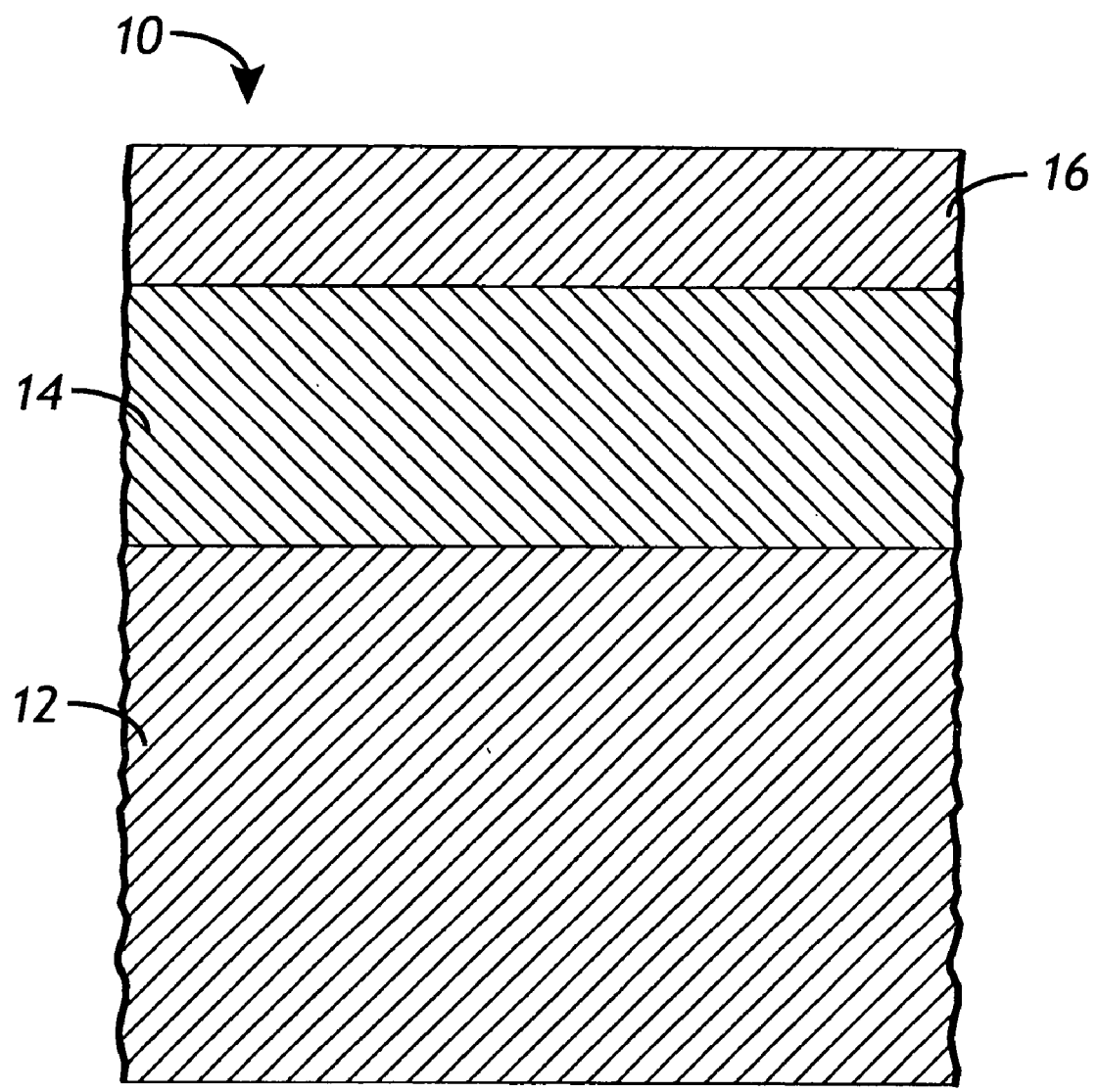
FIG. 1 is a cross sectional view, not to scale, of a portion of the substrate having the dark color and protective layer of this invention thereon.
Figure 2:
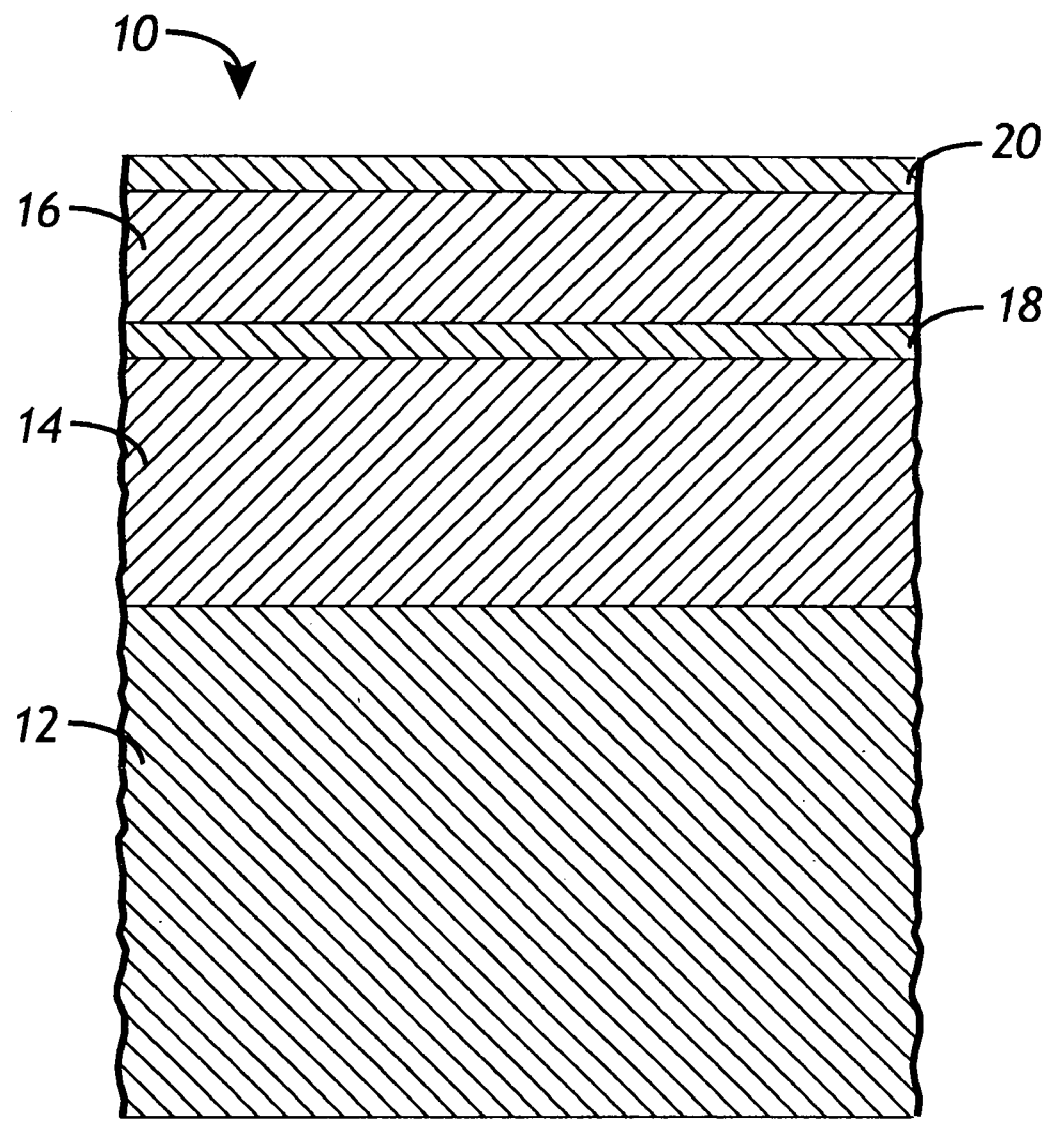
FIG. 2 is a view similar to FIG. 1 showing the adhesion layer intermediate the color layer and the substrate and showing a top layer over the color layer.

In the instant invention, as illustrated in FIGS. 1 and 2, a first layer or series of layers is applied onto the surface of the article by plating such as electroplating in the case of a nickel basecoat. In the case of a polymeric basecoat, the polymer is applied by conventional means. A second series of layers is applied onto the surface of the basecoat layer or layers by vapor deposition. The polymer or electroplated layers serve, inter alia, as a base coat which levels the surface of the article and as a corrosion barrier to improve corrosion resistance. In one embodiment of the instant invention a nickel layer 14 may be deposited on the surface of the article. The nickel layer may be any of the conventional nickels that are deposited by plating, e.g., bright nickel, semi-bright nickel, satin nickel, etc. Nickel layer 14 may be deposited on at least a portion of the surface of the substrate 12 by conventional and well-known electroplating processes. Layer 14 may be one or more layers of copper, nickel and chromium. These corrosion protective layers are well known in the art.

In the instant invention, as illustrated in FIGS. 1 and 2, layer 14 may be comprised of a polymer applied onto surface 14 of article 10 as a basecoat layer. A second series of layers is applied onto the surface of the polymeric layer by vapor deposition. The polymeric layer serves, inter alia, as a base coat which levels the surface of the article and as a corrosion barrier to improve corrosion resistance. In the instant invention polymeric layer 14 is deposited on the surface of the article.

Polymeric basecoat layer 14 may be comprised of both thermoplastic and thermoset polymeric or resinous material. These polymeric or resinous materials include the well known, conventional and commercially available polycarbonates, epoxy urethanes, polyacrylates, polymethacrylates, nylons, polyesters, polypropylenes, polyepoxies, alkyds and styrene containing polymers such as polystyrene, styrene-acrylonitrile (SAN), styrene-butadiene, acrylonitrile-butadiene-styrene (ABS), and blends and copolymers thereof. The polymers for layer 14 are well known in the art.

Over layer 14 is deposited, by vapor deposition such as physical vapor deposition or chemical vapor deposition, protective and decorative color layer 16. Color layer 16 is comprised of a layer refractory metal oxycarbide having an oxygen content and a carbon content wherein the oxygen content is greater than carbon content. Layer 16 has a dark gray or bronze color or appearance. The refractory metal may be hafnium, tantalum, zirconium or titanium, and preferably is zirconium. Generally, the refractory metal oxycarbide is 30 to 40 atomic percent oxygen, 10 to 20 atomic percent carbon and 40 to 60 atomic percent refractory metal. Preferably, the refractory metal oxycarbide is 20 atomic percent carbon.

The thickness of this color and protective layer 16 is a thickness which is at least effective to provide the color of dark gray and to provide abrasion resistance, scratch resistance, and wear resistance. Generally, this thickness is at least about 1,000 Å, preferably at least about 1,500 Å, and more preferably at least about 2,500 Å. The upper thickness range is generally not critical and is dependent upon secondary considerations such as cost. Generally a thickness of about 7500 Å, preferably about 5000 Å should not be exceeded.

Layer 16 is deposited by conventional and well known techniques including vapor deposition techniques such as cathodic arc evaporation (CAE) or sputtering, and the like. Sputtering and CAE techniques and equipment are disclosed, inter alia, in J. Vossen and W. Kern "Thin Film Processes II", Academic Press, 1991; R. Boxman et al, "Handbook of Vacuum Arc Science and Technology", Noyes Pub., 1995; and U.S. Pat. Nos. 4,162,954 and 4,591,418, all of which are incorporated herein by reference.

One method of depositing layer 16 is by physical vapor deposition utilizing reactive sputtering or reactive cathodic arc evaporation. Reactive cathodic arc evaporation and reactive sputtering are generally similar to ordinary sputtering and cathodic arc evaporation except that a reactive gas is introduced into the chamber which reacts with the dislodged target material.

In addition to protective color layer 16 there may optionally be present additional vapor deposited layers. These additional vapor deposited layers may include adhesion layer 18 comprised of refractory metal. The refractory metals include hafnium, tantalum, zirconium, titanium and titanium-zirconium alloys. The refractory metal layer generally functions, inter alia, as an adhesion of color layer 16 to layer 14. As illustrated in FIG. 2, refractory metal adhesion layer 18 is generally disposed intermediate color layer 16 and basecoat layer 14. Layer 18 has a thickness which is generally at least effective for layer 18 to function as an adhesion layer. Generally, this thickness is at least about 60 Å, preferably at least about 120 Å, and more preferably at least about 250 Å. The upper thickness range is not critical and is generally dependent upon considerations such as cost. Generally, however, layer 18 should not be thicker than about 1.2 μm, preferably about 0.5 μm, and more preferably about 0.25 μm.

Refractory metal adhesion layer 18 is deposited by conventional and well known vapor deposition techniques including physical vapor deposition techniques such as cathodic arc evaporation (CAE) or sputtering. Briefly, in the sputtering deposition process a refractory metal (such as titanium or zirconium) target, which is the cathode, and the substrate are placed in a vacuum chamber. The air in the chamber is evacuated to produce vacuum conditions in the chamber. An inert gas, such as Argon, is introduced into the chamber. The gas particles are ionized and are accelerated to the target to dislodge titanium or zirconium atoms. The dislodged target material is then typically deposited as a coating film on the substrate.

In cathodic arc evaporation, an electric arc of typically several hundred amperes is struck on the surface of a metal cathode such as zirconium or titanium. The arc vaporizes the cathode material, which then condenses on the substrates forming a coating.

In a preferred embodiment of the present invention the refractory metal is comprised of titanium or zirconium, preferably zirconium.

In one embodiment of the invention as illustrated in FIG. 2 layer 20 comprised of a refractory metal oxide is deposited onto layer 16. The metals that may be employed in the practice of this invention are those which are capable of forming a metal oxide under suitable conditions, for example, using a reactive gas comprised of oxygen. The metals may be, for example, tantalum, hafnium, zirconium, and titanium, preferably titanium, and zirconium, and more preferably zirconium.

Layer 20 can be deposited by well known and conventional vapor deposition techniques, including reactive sputtering and cathodic arc evaporation.

Layer 20 is effective in providing improved chemical, such as acid or base, resistance to the coating. Layer 20 generally has a thickness at least effective to provide improved chemical resistance but is not so thick as to obscure the color of color layer 16. Generally this thickness is at least about 10 Å, preferably at least about 25 Å, and more preferably at least about 40 Å. That is to say layer 20 should be thin enough so that it is non-opaque or substantially transparent. Generally layer 20 should not be thicker than about 0.10 μm, preferably about 250 Å, and more preferably about 100 Å.

In order that the invention may be more readily understood, the following example is provided. The example is illustrative and does not limit the invention thereto.

EXAMPLE I

Brass faucets are placed in a conventional soak cleaner bath containing the standard and well known soaps, detergents, defloculants and the like which is maintained at a pH of 8.9-9.2 and a temperature of 180-200° F. for about 10 minutes. The brass faucets are then placed in a conventional ultrasonic alkaline cleaner bath. The ultrasonic cleaner bath has a pH of 8.9-9.2, is maintained at a temperature of about 160-180° F., and contains the conventional and well known soaps, detergents, defloculants and the like. After the ultrasonic cleaning the faucets are rinsed and placed in a conventional alkaline electro cleaner bath.

The electro cleaner bath is maintained at a temperature of about 140-180° F., a pH of about 10.5-11.5, and contains standard and conventional detergents. The faucets are then rinsed twice and placed in a conventional acid activator bath. The acid activator bath has a pH of about 2.0-3.0, is at an ambient temperature, and contains a sodium fluoride based acid salt. The faucets are then rinsed twice and placed in a bright nickel plating bath for about 12 minutes. The bright nickel bath is generally a conventional bath which is maintained at a temperature of about 130-150° F., a pH of about 4.0, contains $NiSO_4$, $NiCl_2$, boric acid, and brighteners. A bright nickel layer of an average thickness of about 10 μm is deposited on the faucet surface.

The bright nickel plated faucets are rinsed three times and then placed in a conventional, commercially available hexavalent chromium plating bath using conventional chromium plating equipment for about seven minutes. The hexavalent chromium bath is a conventional and well known bath which contains about 32 ounces/gallon of chromic acid. The bath also contains the conventional and well known chromium plating additives. The bath is maintained at a temperature of about 112°-116° F., and utilizes a mixed sulfate/fluoride catalyst. The chromic acid to sulfate ratio is about 200:1. A chromium layer of about 0.25 μm is deposited on the surface of the bright nickel layer. The faucets are thoroughly rinsed in deionized water and then dried.

The chromium plated faucets are placed in a cathodic arc evaporation plating vessel. The vessel is generally a cylindrical enclosure containing a vacuum chamber which is adapted to be evacuated by means of pumps. A source of argon gas is connected to the chamber by an adjustable valve for varying the rate of flow of argon into the chamber. In addition, sources of methane and oxygen gases are connected to the chamber by adjustable valves for varying the flow rates of methane and oxygen into the chamber.

A cylindrical cathode is mounted in the center of the chamber and connected to negative outputs of a variable D.C. power supply. The positive side of the power supply is connected to the chamber wall. The cathode material comprises zirconium.

The plated faucets are mounted on spindles, of which are mounted on a ring around the outside of the cathode. The entire ring rotates around the cathode while each spindle also rotates around its own axis, resulting in a so-called planetary motion which provides uniform exposure to the cathode for the multiple faucets mounted around each spindle. The ring typically rotates at several rpm, while each spindle makes several revolutions per ring revolution. The spindles are electrically isolated from the chamber and provided with rotatable contacts so that a bias voltage may be applied to the substrates during coating.

The vacuum chamber is evacuated to a pressure of about $10^{-5}$ to $10^{-7}$ torr and heated to about 150° C.

The electroplated faucets are then subjected to a high-bias arc plasma cleaning in which a (negative) bias voltage of about −600 volts is applied to the electroplated faucets while an arc of approximately 500 amperes is struck and sustained on the cathode. The duration of the cleaning is approximately five minutes.

Argon gas is introduced at a rate sufficient to maintain a pressure of about 1 to 5 millitorr. A layer of zirconium having an average thickness of about 0.1 μm is deposited on the chrome plated faucets during a three minute period. The cathodic arc deposition process comprises applying D.C. power to the cathode to achieve a current flow of about 500 amps, introducing argon gas into the vessel to maintain the pressure in the vessel at about 1 to 5 millitorr and rotating the faucets in a planetary fashion described above.

After the zirconium layer is deposited, a zirconium oxycarbide color layer is deposited on the zirconium layer. Flows of methane are introduced into the vacuum chamber while the arc discharge continues at approximately 500 amperes. In order to increase the darkness of the coating, a flow of oxygen, amounted to 30 to 40 percent of the total gas flow, may also be introduced into the chamber to produce the dark gray color. The flow rate of methane is increased and thus the resulting layer contains a carbon content between 10 to 20 atomic percent. After this zirconium oxycarbide layer is deposited, the flow of oxygen of approximately 100 to 500 standard liters per minute is introduced for a time of about 10 to 60 seconds. A thin layer of zirconium oxide with a thickness of about 20 to 100 Å is formed. The arc is extinguished, the vacuum chamber is vented and the coated articles removed.

EXAMPLE II

Other brass faucets were prepared according to the procedures of Example I except that polymeric basecoats were used instead of nickel basecoats. The initial cleaning procedures of Example I were followed. After the ultrasonic cleaning the faucets are rinsed and dried.

A basecoat polymeric composition is applied onto the cleaned and dried faucets by a standard and conventional high volume low pressure gun. The polymer is comprised of 35 weight percent styrenated acrylic resin, 30 weight percent melamine formaldehyde resin, and 35 weight percent bisphenol A epoxy resin. The polymer is dissolved in sufficient solvents to provide a polymeric composition containing about 43 weight percent solids. After the basecoat is applied onto the faucets the faucets are allowed to sit for 20 minutes for ambient solvent flash off. The faucets are then baked at 375° F. for two hours. The resulting cured polymeric basecoat has a thickness of about 20 μm.

The polymeric coated faucets are rinsed three times and then placed in a conventional, commercially available hexavalent chromium plating bath using conventional chromium plating equipment according to the procedures of Example I. The remaining procedures of Example I were followed to produce coated articles having the same colored stack layer of Example I.

EXAMPLE III

In this example, the base material description is the same as the previous two examples. The description of PVD deposition is exactly the same with the exception of the use of titanium rather than zirconium. The end color is a dark oil rubbed bronze color rather than dark gray.

EXAMPLE IV

In Examples I to III, the end colors were in the color ranges for gray and bronze. These were measured on a color spectrophotometer using a D65 illuminant.

As is known, the measurement of color is determined by three specific parameters in which "L" is a measure of the lightness of an object, "a" is a measure of the redness (positive) or greenness (negative), and "b" is a measure of yellowness (positive) or blueness (negative). These three parameters, together, define a specific color.

The measured colors fell within the following ranges.

DARK GRAY $L^*=52.0+/-5.0$
$a^*=0.00+/-2.0$
$b^*=2.00+/-3.0$

DARK BRONZE $L^*=50.0+/-6.0$
$a^*=6.00+/-2.0$
$b^*=12.00+/-5.0$

While certain embodiments of the invention have been described for purposes of illustration, it is to be understood that there may be various embodiments and modifications within the general scope of the invention.

What is claimed is:

1. An article comprising a substrate having a surface and having on at least a portion of the surface a coating having a dark color comprising:
   a color and protective layer comprised of a layer of refractory metal oxycarbide having an oxygen content and a carbon content wherein the oxygen content is greater than the carbon content;
   wherein the refractory metal oxycarbide is comprised of 30 to 40 atomic percent oxygen, 10 to 20 atomic percent carbon and 50 to 60 atomic percent refractory metal.

2. The article of claim 1 wherein the refractory metal is hafnium, tantalum, zirconium, titanium or zirconium-titanium alloy.

3. The article of claim 1 wherein the refractory metal is zirconium.

4. The article of claim 1 wherein the refractory metal oxycarbide is zirconium oxycarbide.

5. The article of claim 1 wherein the refractory metal oxycarbide is 10 atomic percent carbon and 30 to 40 atomic percent oxygen.

6. The article of claim 1 wherein the dark color is dark gray or dark bronze.

7. An article comprising a substrate having a surface and having on at least a portion of the surface a coating having a dark color comprising:
- a color and protective layer comprised of a layer of refractory metal oxycarbide having an oxygen content and a carbon content wherein the oxygen content is greater than the carbon content; and
- including an adhesion layer of a refractory metal between the substrate and the color layer.

8. The article of claim 7 wherein the refractory metal of the adhesion layer is hafnium, tantalum, zirconium, titanium or a titanium-zirconium alloy.

9. The article of claim 7 wherein the refractory metal of the adhesion layer is zirconium.

10. An article comprising a substrate having a surface and having on at least a portion of the surface a coating having a dark color comprising:
- a color and protective layer comprised of a layer of refractory metal oxycarbide having an oxygen content and a carbon content wherein the oxygen content is greater than the carbon content; and
- including a top layer of refractory metal oxide over the color layer.

11. The article of claim 10 wherein the refractory metal of the top layer is hafnium, tantalum, zirconium or titanium.

12. The article of claim 10 wherein the refractory metal of the top layer is zirconium.

13. The article of claim 10 wherein the top layer is zirconium oxide.

14. An article having a dark color comprising:
- a substrate having a surface; and
- a color and protective layer on at least a portion of the substrate wherein the color layer is a zirconium oxycarbide having an oxygen content and a carbon content wherein the oxygen content is greater than the carbon content;
- wherein the zirconium oxycarbide is 30 to 40 atomic percent oxygen, 10 to 20 atomic percent carbon and 50 to 60 atomic percent zirconium.

15. An article according to claim 14 wherein the dark color is dark gray or dark bronze.

16. An article having a dark color comprising:
- a substrate having a surface; and
- a color and protective layer on at least a portion of the substrate wherein the color layer is a zirconium oxycarbide having an oxygen content and a carbon content wherein the oxygen content is greater than the carbon content; and
- including an adhesion layer of zirconium metal between the substrate and the color layer.

17. An article according to claim 16 including a top layer of zirconium oxide over the color layer.

18. An article according to claim 15 having a dark color comprising:
- a substrate having a surface; and
- a color and protective layer on at least a portion of the substrate wherein the color layer is a zirconium oxycarbide having an oxygen content and a carbon content wherein the oxygen content is greater than the carbon content; and
- including a top layer of zirconium oxide over the color layer.

* * * * *